US010232225B1

(12) United States Patent
Oberc et al.

(10) Patent No.: US 10,232,225 B1
(45) Date of Patent: Mar. 19, 2019

(54) SYSTEMS AND METHODS FOR OBTAINING SPORTS-RELATED DATA

(71) Applicant: MITCHELL O ENTERPRISES LLC, Highland, IN (US)

(72) Inventors: Steve Oberc, Chicago, IL (US); Hare Patnaik, Rochester Hills, MI (US); Subra Ganesan, Rochester Hills, MI (US)

(73) Assignee: Mitchell O Enterprises LLC, Highland, IN (US)

( * ) Notice: Subject to any disclaimer, the term of this patent is extended or adjusted under 35 U.S.C. 154(b) by 286 days.

(21) Appl. No.: 15/163,290

(22) Filed: May 24, 2016

Related U.S. Application Data

(60) Provisional application No. 62/169,194, filed on Jun. 1, 2015.

(51) Int. Cl.
*A63B 69/36* (2006.01)
*A63B 37/00* (2006.01)
(Continued)

(52) U.S. Cl.
CPC ...... *A63B 37/0054* (2013.01); *A63B 24/0003* (2013.01); *A63B 24/0006* (2013.01); *A63B 43/00* (2013.01); *A63B 69/36* (2013.01); *A63B 69/3632* (2013.01); *A63B 69/3655* (2013.01); *A63B 69/3658* (2013.01); *A63B 2225/15* (2013.01); *G06K 9/00342* (2013.01); *G06K 9/00375* (2013.01)

(58) Field of Classification Search
CPC . A63B 24/0003; A63B 24/0006; A63B 69/36; A63B 69/3655; A63B 69/3658; A63B 69/3632; G06K 9/00342; G06K 9/00375
See application file for complete search history.

(56) References Cited

U.S. PATENT DOCUMENTS 6,908,404 B1 6/2005 Gard
7,059,974 B1 6/2006 Golliffe et al.
(Continued)

FOREIGN PATENT DOCUMENTS

CN 103706088 A 4/2014
KR 1020070093169 A 9/2007
(Continued)

*Primary Examiner* — Steven J Hylinski
(74) *Attorney, Agent, or Firm* — Winston & Strawn LLP

(57) ABSTRACT

Systems and methods for obtaining golf-related data involving the electronics in a golf ball, a golf club, a wearable device, and a smart device for obtaining golf-related data are disclosed. The golf ball includes one or more of a gyroscope, an accelerometer, and a magnetometer to measure data related to the golf ball. The golf club includes one or more of a gyroscope, an accelerometer, and a magnetometer to measure data related to the golf club. The wearable device includes one or more of a gyroscope, an accelerometer, and a magnetometer to measure data related to the wearable device. The smart device includes a processor that is configured to calculate additional data using at least one of the data related to the golf ball, the data related to the golf club, and the data related to the wearable device. Counterpart methods and computer-readable medium embodiments are also provided.

22 Claims, 8 Drawing Sheets

SAMPLE ELECTRONICS INSIDE GOLF BALL

(51) Int. Cl.
  *A63B 43/00* (2006.01)
  *A63B 24/00* (2006.01)
  *G06K 9/00* (2006.01)

(56) References Cited

U.S. PATENT DOCUMENTS

| | | | |
|---|---|---|---|
| 7,091,863 B2 | 8/2006 | Ravet | |
| 7,095,312 B2 | 8/2006 | Erario et al. | |
| 7,789,742 B1 | 9/2010 | Murdock et al. | |
| 7,970,734 B2 | 6/2011 | Townsend et al. | |
| 8,206,246 B2 | 6/2012 | Joseph et al. | |
| 8,231,506 B2 | 7/2012 | Molyneux et al. | |
| 8,257,191 B2 | 9/2012 | Stites et al. | |
| 8,353,791 B2 | 1/2013 | Holthouse et al. | |
| 8,446,255 B2 | 5/2013 | Balardeta et al. | |
| 8,465,376 B2 | 6/2013 | Bentley | |
| 8,540,583 B2 | 9/2013 | Leech | |
| 8,696,482 B1 | 4/2014 | Pedenko et al. | |
| 8,702,430 B2 * | 4/2014 | Dibenedetto | H04M 1/7253 434/247 |
| 8,747,242 B2 | 6/2014 | Erario et al. | |
| 8,941,723 B2 | 1/2015 | Bentley et al. | |
| 8,989,441 B2 | 3/2015 | Han et al. | |
| 9,129,153 B2 | 9/2015 | Ianni et al. | |
| 9,186,568 B2 | 11/2015 | Ianni et al. | |
| 9,233,292 B2 | 1/2016 | Joseph et al. | |
| 9,254,432 B2 | 2/2016 | Ianni et al. | |
| 9,492,724 B2 | 11/2016 | Thurman et al. | |
| 2002/0077189 A1 * | 6/2002 | Tuer | A63B 69/3632 473/151 |
| 2002/0091017 A1 | 7/2002 | Kuesters | |
| 2002/0188359 A1 | 12/2002 | Morse | |
| 2005/0164808 A1 | 7/2005 | Sasaki | |
| 2005/0233815 A1 | 10/2005 | McCreary et al. | |
| 2006/0148594 A1 * | 7/2006 | Saintoyant | A63B 69/3632 473/405 |
| 2010/0117837 A1 | 5/2010 | Stirling et al. | |
| 2010/0151955 A1 | 6/2010 | Holden | |
| 2011/0081978 A1 | 4/2011 | Murdock et al. | |
| 2011/0130230 A1 | 6/2011 | Solberg et al. | |
| 2011/0207553 A1 | 8/2011 | Reid et al. | |
| 2011/0305369 A1 * | 12/2011 | Bentley | G06K 9/00342 382/103 |
| 2012/0088544 A1 | 4/2012 | Bentley et al. | |
| 2012/0142443 A1 * | 6/2012 | Savarese | A63B 71/06 473/199 |
| 2012/0234094 A1 * | 9/2012 | Starzynski | G01P 15/097 73/514.29 |
| 2012/0255999 A1 | 10/2012 | Luciano, Jr. et al. | |
| 2012/0303207 A1 | 11/2012 | Reindl | |
| 2013/0053190 A1 | 2/2013 | Mettler | |
| 2013/0128022 A1 | 5/2013 | Bose et al. | |
| 2013/0167290 A1 | 7/2013 | Ben Ezra | |
| 2013/0184091 A1 * | 7/2013 | Rauchholz | A63B 53/06 473/198 |
| 2013/0316840 A1 * | 11/2013 | Marks | G09B 19/0038 473/199 |
| 2014/0002266 A1 | 1/2014 | Rayner | |
| 2014/0128171 A1 | 5/2014 | Anderson | |
| 2016/0096067 A1 | 4/2016 | Ianni et al. | |
| 2016/0096071 A1 | 4/2016 | Ianni et al. | |
| 2016/0292469 A1 | 10/2016 | Ianni et al. | |
| 2017/0128814 A1 | 5/2017 | Ianni et al. | |

FOREIGN PATENT DOCUMENTS

| | | |
|---|---|---|
| WO | 2005/116944 A2 | 12/2005 |
| WO | 2006/119563 A1 | 11/2006 |
| WO | 2011/008082 A1 | 1/2011 |
| WO | 2014/042402 A2 | 3/2014 |
| WO | 2015/075108 A1 | 5/2015 |

* cited by examiner

SYSTEMS AND METHODS FOR OBTAINING SPORTS-RELATED DATA

CROSS REFERENCE TO RELATED APPLICATION

This application claims the benefit of U.S. provisional application No. 62/169,194 filed Jun. 1, 2015, the entire contents of which are expressly incorporated herein by reference thereto.

FIELD OF THE INVENTION

The present invention relates to systems and methods for obtaining golf-related data, and in particular, to systems and methods involving the electronics in a golf ball, a golf club, a wearable device, and a smart device for obtaining golf-related data.

BACKGROUND OF THE INVENTION

Golf is enjoyed by a wide variety of players—players of different genders and dramatically different ages and/or skill levels. Golf is somewhat unique in the sporting world in that such diverse collections of players can play together in golf events, even in direct competition with one another (e.g., using handicapped scoring, different tee boxes, in team formats, etc.), and still enjoy the golf outing or competition. These factors, together with the increased availability of golf programming on television (e.g., golf tournaments, golf news, golf history, and/or other golf programming) and the rise of well-known golf superstars, at least in part, have increased golf's popularity in recent years, both in the United States and across the world.

Golfers at all skill levels seek to improve their performance and sometimes they can lose their golf balls after a poor swing or mishit during practice due to a relatively large green playing field, often having to forego searching for their lost golf balls and constantly replace their golf balls. Manufacturers of all types of golf equipment have responded to these demands, and in recent years, the industry has witnessed dramatic changes and improvements in golf equipment and related devices. For example, a wide range of different golf ball models now are available, with balls designed to track their locations, expedite searches for lost golf balls, and complement specific swing speeds and/or other player characteristics or preferences. Golf clubs also have been modified to include multiple variations, such as variations in the loft angle, lie angle, offset features, and weighting characteristics of the club head (e.g., draw biased club heads, fade biased club heads, neutrally weighted club heads, etc.). Moreover, the club heads may be combined with a variety of different shafts, e.g., from different manufacturers; having different stiffness, flex points, kick points, or other flexion characteristics, etc.; made from different materials; etc. Between the available variations in shafts and club heads, there are literally hundreds of different club head/shaft combinations available to the golfer.

Additionally, mobile devices and computer systems have been utilized to obtain data from golf equipment and to provide analysis and other data based on the obtained data. They also have been employed to video record athletes' motion before and after swinging. The obtained data and analysis and the recorded motions may aid golfers to improve their performance and body mechanics.

Despite the aforementioned golf balls, golf clubs, and mobile devices, currently those equipment and devices still lack certain electronic components and interaction with each other in manners that can more efficiently and accurately obtain golf-related data. As such, there remains a need for a golf system that is improved over what is known in the art and which solves the above deficiencies.

SUMMARY OF THE INVENTION

The invention relates to a system for obtaining golf-related data comprising a golf ball having associated electronics to measure data related to the golf ball; a golf club having associated electronics to measure data related to the golf club; a wearable device having associated electronics to measure data related to the wearable device; and a smart device having associated electronics to communicate with the golf ball, the golf club, and the wearable device. The associated electronics of the smart device comprise a processor configured to calculate additional data using at least one of the data related to the golf ball, the data related to the golf club, and the data related to the wearable device, with the additional data being different from the data related to the golf ball, the data related to the golf club, and the data related to the wearable device. The associated electronics of the golf ball comprise a processor and transceiver configured to measure acceleration of the golf ball while also being configured to transmit the measured acceleration of the golf ball to the smart device via a communications protocol. Also, the associated electronics of the golf club comprise a processor and transceiver configured to calculate additional data for the golf club using the data related to the golf club while also being configured to transmit the additional data of the golf club to the smart device via a communications protocol. Finally, the associated electronics of the wearable device comprise a processor and transceiver configured to calculate additional data for the wearable device using the data related to the wearable device while also being configured to transmit the additional data of the wearable device to the smart device via a communications protocol.

The associated electronics include a plurality of devices that conduct the measurements disclosed herein. Preferably, the plurality of electronic devices of the golf ball performs no calculations using the data related to the golf ball. Similarly, the plurality of electronic devices of the smart device perform no calculations of the additional data for the golf club and the additional data for the golf club is different from the data related to the golf club. Finally, the plurality of electronic devices of the smart device perform no calculations of the additional data for the wearable device and the additional data for the wearable device is different from the data related to the wearable device. This enables the system to provide the desired analysis quickly and without redundancy.

The smart device is typically configured to calculate additional data using only the data related to the golf ball and to fuse the calculated additional data with the additional data for the golf club and the additional data for the wearable device. Also, the data related to the golf ball includes one or all of golf ball rotation data, golf ball acceleration data, golf ball motion data, and golf ball magnetism data. The calculated additional data includes one or all of effective acceleration of golf ball, angle of golf ball flight, and impact force on golf ball. The data related to the golf club includes one or all of golf club rotation, golf club acceleration, and golf club magnetism. The additional data for the golf club includes one or all of effective acceleration of golf club, angle of ball flight, and impact force on golf club. The data related to the wearable device includes one or all of hand rotation data, hand acceleration data, and magnetism change data resulted from swinging the wearable device. The additional data for the wearable device includes one or all of effective acceleration of wearable device, angle of golf ball flight, swing angle of golfer's hand, and swing angle of golf club.

The communications protocol is WiFi, Bluetooth, 802.11, Bluetooth, a radio frequency system, infrared, GSM, GSM plus EDGE, CDMA, quadband, or any other suitable protocol, with the associated electronics of the golf ball configured to measure data related to the golf ball on 30 Hz basis.

Another embodiment of the invention relates to a system for obtaining golf-related data comprising a golf ball including one, two or preferably all of a gyroscope, an accelerometer, and a magnetometer to measure data related to the golf ball, wherein each of the gyroscope, the accelerometer, and the magnetometer of the golf ball is configured to measure data related to the golf ball after the golf ball is struck; a golf club including one, two or preferably all of a gyroscope, an accelerometer, and a magnetometer to measure data related to the golf club, wherein each of the gyroscope, the accelerometer, and the magnetometer of the golf club is configured to measure data related to the golf club only before the golf ball is struck; a wearable device including one, two or preferably all of a gyroscope, an accelerometer, and a magnetometer to measure data related to the wearable device, wherein each of the gyroscope, the accelerometer, and the magnetometer of the wearable device is configured to measure data related to the wearable device only before the golf ball is struck; and a smart device including a processor and a non-transient or non-volatile memory, the processor is configured to calculate additional data using at least one of the data related to the golf ball, the data related to the golf club, and the data related to the wearable device, the additional data is different from the data related to the golf ball, the data related to the golf club, and the data related to the wearable device.

The processor is configured to calculate additional data using only the data related to the golf ball, and the data related to the golf ball, the data related to the golf club, and the data related to the wearable device are all measured in real time. Each of the measured data related to the golf ball, the measured data related to the golf club, and the measured data related to the wearable device is preferably stored in the non-transient memory with a time stamp.

For optimum operation, each of the golf ball, golf club, and wearable device further comprises a wirelessly chargeable power source. The processor is typically a Bluetooth low energy processor and, if desired, each of the golf ball, golf club, and wearable device further comprises a processor of that type.

The gyroscope, accelerometer, and magnetometer in each of the golf ball, golf club, and wearable device may be and preferably is coated with graphene. Each of the gyroscope, the accelerometer, and the magnetometer of the golf club is configured to measure data related to the golf club before each of the gyroscope, the accelerometer, and the magnetometer of the wearable device measures data related to the wearable device.

A more general aspect of the invention relates to a system for obtaining sport-related data comprising a ball or game implement having associated electronics to measure data related to the ball or game implement; a structure separate from the ball or game implement and used in connection therewith also having associated electronics to measure data related to the structure; and a wearable device having associated electronics to measure data related to the wearable device. The smart device has associated electronics to communicate with the ball or game implement, the structure, and the wearable device, with the associated electronics of the smart device comprising a processor configured to calculate additional data using at least one of the data related to the ball or game implement, the data related to the structure club, and the data related to the wearable device, with the additional data being different from the data related to the ball or implement, the data related to the structure, and the data related to the wearable device. Also, the associated electronics of the ball or game implement comprise a processor and transceiver configured to measure acceleration of the ball or game implement while also being configured to transmit the measured acceleration of the ball or game implement to the smart device via a communications protocol, while the associated electronics of the structure comprise a processor and transceiver configured to calculate additional data for the structure using the data related to the structure while also being configured to transmit the additional data of the structure to the smart device via a communications protocol. Similarly, the associated electronics of the wearable device comprise a processor and transceiver configured to calculate additional data for the wearable device using the data related to the wearable device while also being configured to transmit the additional data of the wearable device to the smart device via a communications protocol.

In this system, the ball or game implement may be a golf ball, baseball, football, basketball, hockey puck, soccer ball, tennis ball, bowling ball, javelin, discuss, shot-put, badminton birdie or arrow, and the structure is related to the ball or game implement and may include, as applicable, a hitting device, such as a golf club, baseball bat, tennis racket, hockey stick, lacrosse stick, badminton racket, ping pong paddle, or a structure to be hit or contacted, such as a bowling pin, goal, goal post, hoop, rim, backboard, net, table, field marker or target. Thus, a player or participant in any of these sports or similar activities can monitor his or her performance in order to receive data in real time with a goal of increasing their skills or prowess at playing the game or obtaining better form or abilities.

Counterpart methods and computer-readable medium embodiments would be understood from the above and the overall disclosure. Also, to emphasize, broader, narrower, or different combinations of described features are contemplated, such that, for example features can be removed or added in a broadening or narrowing way.

BRIEF DESCRIPTION OF THE DRAWINGS

For the purposes of illustrating the present invention, there is shown in the drawings a form which is presently preferred, it being understood however, that the invention is not limited to the precise form shown by the drawing in which.

DETAILED DESCRIPTION OF THE INVENTION

Figure 1:
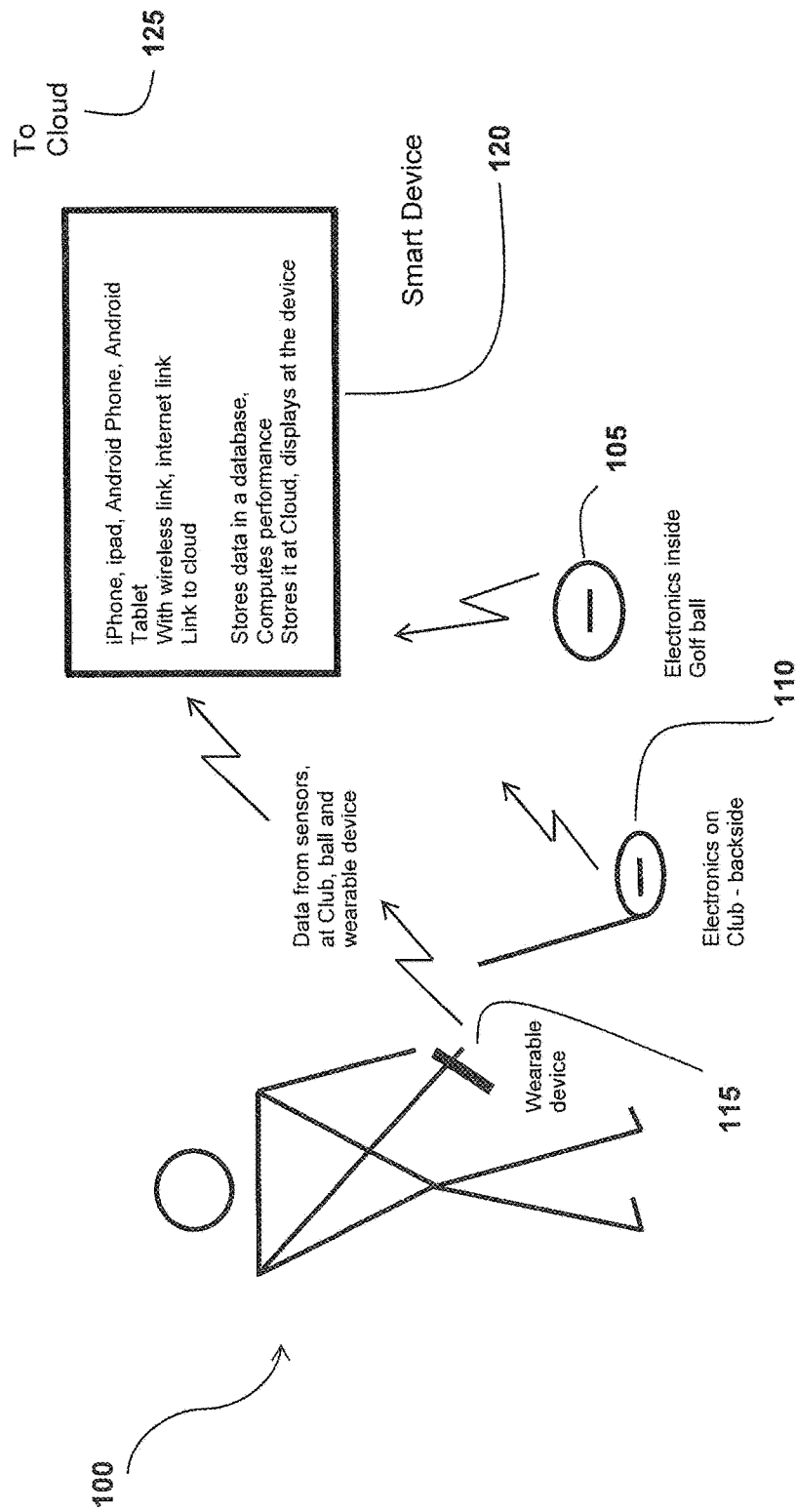
FIG. 1 depicts an illustrative system for obtaining golf-related data in accordance with some embodiments of the present invention.

Preferred embodiments of the present invention now will be described more fully hereinafter with reference to the accompanying drawings. Referring to FIG. 1, one embodiment of the system for obtaining golf-related data is illustrated. The system may comprise a golf ball 105, a golf club 110, a wearable device 115, and a smart device 120. Each of the golf ball 105, golf club 110, and wearable device 115 may contain a plurality of electronics that can obtain golf-related data. The obtained data may be uploaded to the Cloud 125 for later retrieval and viewing by the golfer, audience, or any other interested individuals at any location.

Figure 2:
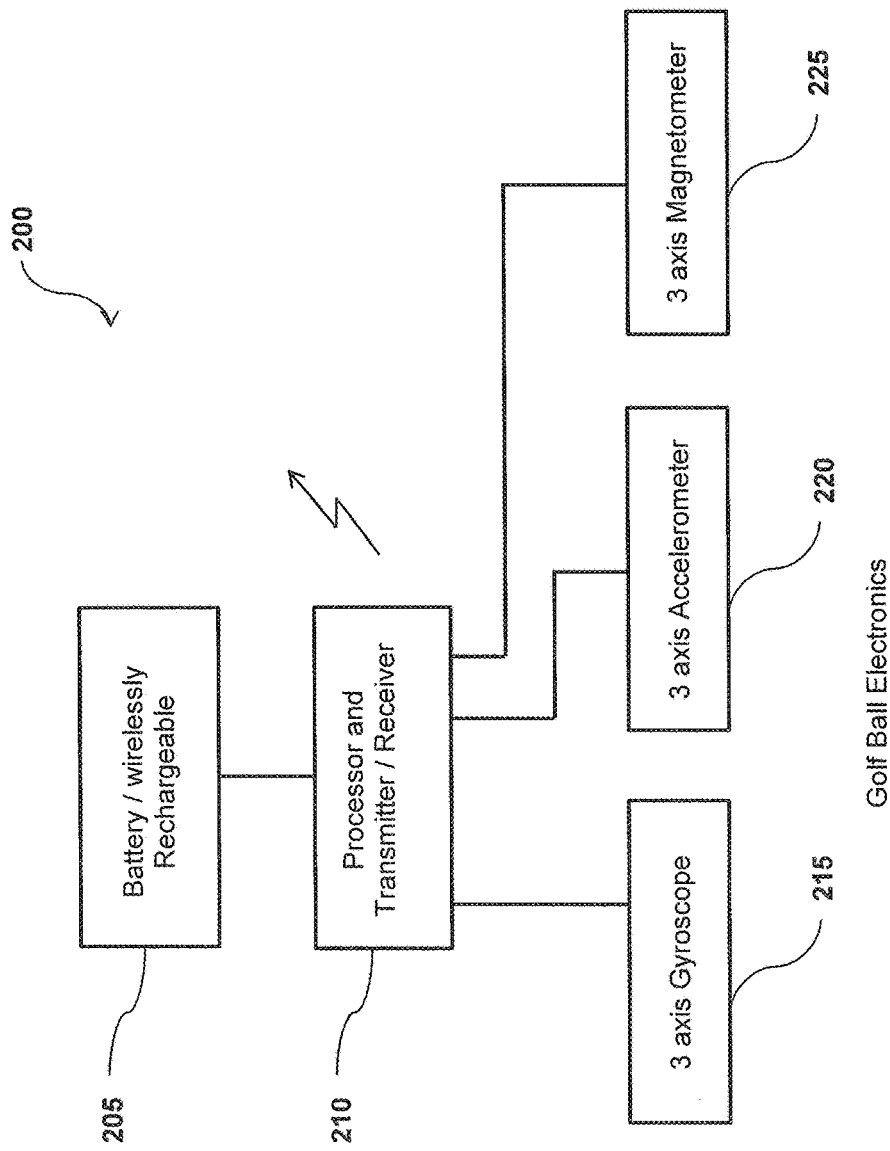
FIG. 2 depicts illustrative golf ball electronics in accordance with some embodiments of the present invention.

Referring to FIG. 2, one preferred embodiment of the golf ball electronics 200 is illustrated. The golf ball electronics 200 may include a power source 205, a processor and transceiver 210, a 3-axis gyroscope 215, a 3-axis accelerometer 220, and a 3-axis magnetometer 225. The gyroscope 215, the accelerometer 220, and the magnetometer 225 may be collectively referred to as sensors. In some embodiments, the golf ball electronics 200 may comprise only a power source 205, a processor and transceiver 210, and a 3-axis gyroscope 215 or a 3-axis accelerometer 225 or of both. The power source 205 is electrically and directly connected to the processor and transceiver 210 to power the processor and transceiver 210. The processor and transceiver 210 is electrically and directly connected to each of the gyroscope 215, accelerometer 220, and magnetometer 225 to execute the functions of each of the gyroscope 215, accelerometer 220, and magnetometer 225. The processor and transceiver 210 serve as an intermediary electrical connection between the power source 205 and each of the gyroscope 215, accelerometer 220, and magnetometer 225. A transmitter or receiver may also be employed instead of the transceiver.

The power source 205 may be a battery. The battery may be rechargeable or non-rechargeable. When the battery is rechargeable, the recharging may be wired or wireless. In a preferred embodiment, the battery is wirelessly rechargeable. Wireless charging or inductive charging uses an electromagnetic field to transfer energy between two objects. This is usually done with a charging station. Energy is sent through an inductive coupling to an electrical device, which can then use that energy to charge batteries or run the device. Wireless chargers typically use an induction coil to create an alternating electromagnetic field from within a charging base station, and a second induction coil in the portable device takes power from the electromagnetic field and converts it back into electrical current to charge the battery. The two induction coils in proximity combine to form an electrical transformer. Greater distances between sender and receiver coils can be achieved when the inductive charging system uses resonant inductive coupling. This resonant system may include using a movable transmission coil i.e. mounted on an elevating platform or arm, and the use of advanced materials for the receiver coil made of silver plated copper or sometimes aluminum to minimize weight and decrease resistance due to the skin effect. The inductive charging technology or electronics employed by the present invention protects the battery from overcharging, eliminates unnecessary discharging when the battery is not charging, and stops charging when the battery is full.

The processor or processing circuitry is operative to control the operations and performance of the gyroscope 215, the accelerometer 220, and the magnetometer 225. For example, the processor can be used to run operating system applications, and firmware applications of those sensors or other applications used by those sensors to communicate with each other or with the sensors in the golf ball, the golf club, and the wearable device. The processor is connected to the transceiver, and via the transceiver or without via the transceiver, the processor can retrieve data from the gyroscope 215, the accelerometer 220, the magnetometer 225, and one or more of the electronics in the golf club, the wearable device, and the smart device, process those data, and store processed or unprocessed data in a transient or non-transient memory. Transient memory may be RAM or other types of memory used for temporarily storing data. Non-transient memory may be ROM, EPROM, EEPROM, and flash memory the like. In a preferred embodiment, the non-transient memory is a flash memory. All the data may be stored in the same or different memory. The processor can initiate and halt the operation of the gyroscope 215, the accelerometer 220, and the magnetometer 225.

The transceiver in the golf ball transmits and receives data from the transceiver in the golf club, the wearable device, and the smart device. The transceiver in the golf club, the wearable device, and the smart device also perform similarly. The transceiver can be a wireless communications integrated circuit designed to implement a particular wireless communication protocol. The transceiver handles wireless protocol interactions and functions such as modulation and transmission. The communication protocol may be WiFi, Bluetooth, 802.11, Bluetooth, radio frequency systems such as 900 MHz, 1.4 GHz, and 5.6 GHz communication systems, infrared, GSM, GSM plus EDGE, CDMA, quadband, and/or any other suitable protocol. A transmitter or receiver may also be employed instead of a transceiver. All the above features work equally with the transmitter or receiver if that is the electronic used.

In a preferred embodiment, both the processor and the transceiver employ Bluetooth low energy (BLE) technology to consume considerably less power while maintaining their normal processing power and communication range.

The 3-axis gyroscope 215 measures golf ball rotation and produces golf ball rotation data in three axes $g_{1x}$, $g_{1y}$, and $g_{1z}$. The 3-axis accelerometer 220 measures golf ball acceleration and produces golf ball acceleration data in three axes $a_{1x}$, $a_{1y}$, and $a_{1z}$. The 3-axis magnetometer 225 measures golf ball magnetism and produces golf ball magnetism data in three axes $m_{1x}$, $m_{1y}$, and $m_{1z}$. Either or both of the gyroscope 215 and the accelerometer 220 may further measure golf ball motion and produce golf ball motion data. These sensors may be activated upon detection of the motion of the golf ball or prior to a golf game. All of the above data may be stored in a transient or non-transient memory located in the golf ball to prevent loss of data due to loss of communication with the smart device. Transient memory may be RAM or other types of memory used for temporarily storing data. Non-transient memory may be ROM, EPROM, EEPROM, and flash memory the like. In a preferred embodiment, the non-transient memory is a flash memory. All the data may be stored in the same or different memory. This memory may be the same memory as the one utilized in the processor or be a different memory. The golf ball electronics may be configured to store any of the data in this memory, the memory in the processor, or both memories. It may also be helpful to include additional data in the memory when such data relates to the performance of the ball. For example, wind velocity and direction can have an effect on ball travel and including this information in memory for processing can be helpful in eliminating the effects of wind on the ball travel compared to what the ball would do just based on the strike of the club. The wind velocity can be manually input into memory from course data, weather data or after being measured. It may be possible to configure one of the sensors to measure this information prior to flight or after landing.

Each of the gyroscope 215, accelerometer 220, and magnetometer 225 may be configured to measure, produce, and/or store its corresponding data periodically and to send that data or a copy of that data to the smart device through the communication protocol discussed above. In a preferred embodiment, each of the gyroscope 215, accelerometer 220 and magnetometer 225 is configured to measure, produce, and/or store its corresponding data on a 30 Hz basis. Each of the gyroscope 215, accelerometer 220, and magnetometer 225 may also be configured to measure, produce, and/or store its corresponding data on a 30 Hz basis at the same time or different time. For example, all of the gyroscope 215, accelerometer 220, and magnetometer 225 may start measuring, producing, and/or storing its corresponding data on a 30 Hz basis at the moment the golf ball is struck by the golf club. In another example, the gyroscope 215 may start measuring, producing, and/or storing its data at the moment the golf ball is struck by the golf club, the accelerometer 220 may start measuring, producing, and/or storing its data at a first time after the golf ball is struck, and the magnetometer 225 may start measuring, producing, and/or storing its data at a second time after the golf ball is struck. The first time may occur before, after, or at the same time as the second time.

Using one or more of the above data, additional data such as effective acceleration, angle of golf ball flight, and impact force on the golf ball may also be obtained with the following equations:

Effective Acceleration of the Golf Ball $a_{1e} = \sqrt{a_{1x}^2 + a_{1y}^2 + a_{1z}^2}$ Angle of Golf Ball Flight = $\tanh^{-1}$ of $a_{1x}, a_{1y},$ and $a_{1z}$ Impact Force on Golf Ball $(F1)$ = Mass of Golf Ball × $a_{1e}$ The mass or weight of the golf ball is pre-measured before incorporating the golf ball electronics and may be stored in the memory of the processor or in any of the sensors. The mass on average is about 45 grams, with tolerance of ±1 gram.

Figure 3:
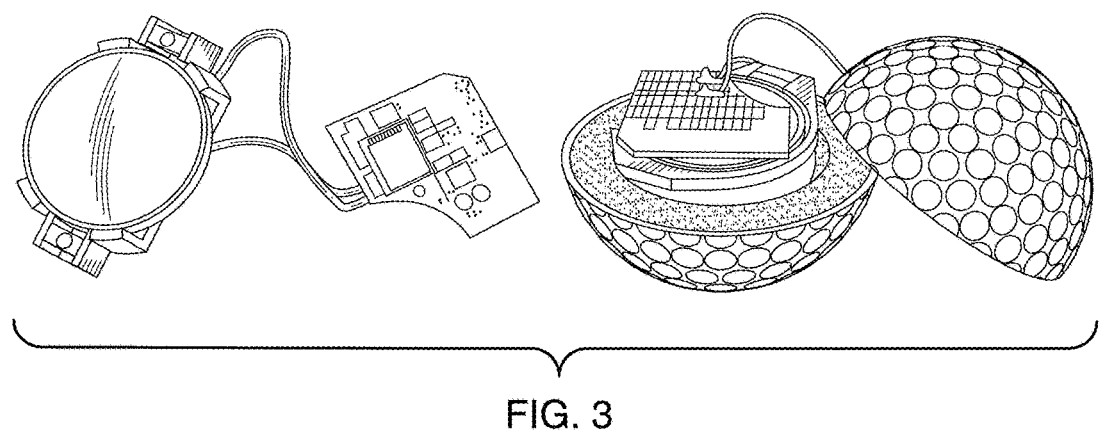
FIG. 3 depicts an example of the golf ball electronics inside a golf ball in accordance with some embodiments of the present invention.

In a preferred embodiment, the algorithms for calculating the effective acceleration, angle of the golf ball flight, and impact force on the golf ball are stored in the smart device and those additional data are calculated by the smart device after the accelerometer 220 transmits its acceleration data to the smart device. The accelerometer 220 only provides acceleration data or acceleration data necessary to calculate effective acceleration and angle of golf ball flight, and does not perform any calculation or the calculation of effective acceleration and angle of golf ball flight. Similarly, the gyroscope 215 and the magnetometer 225 only provide their corresponding data to the smart device and any calculation based on those corresponding data is performed on the smart device. In another preferred embodiment, the algorithms are stored in the processor 210 or the memory of the processor 210 and the calculations of those additional data are performed by the electronics in the golf ball before transmitting the data obtained by the sensors to the smart device. FIG. 3 shows an example of the golf ball electronics inside the golf ball.

The golf ball may be wirelessly connected to the smart device through a communication protocol described above to track the location of the golf ball. The location of the golf ball may be tracked by one or more of the electronics in the golf ball and through the data and additional data provided by the electronics in the golf ball and/or the smart device. The location of the golf ball may also be tracked by adding a Global Positioning System (GPS) into the golf ball. The display of the smart device may indicate that the golf ball is less than 50 feet away with a first color (such as a red color ring), that the golf ball is less than 25 feet away with a second color (such as a yellow color ring), and that the golf ball is less than 10 feet away with a third color (such as a green color ring). The golf ball or the smart device may also produce sound as the golfer goes near the golf ball and the sound may be louder or different as the golfer approaches closer to the golf ball.

In order to compensate for the loss of wireless communication between the ball and smart device, the ball electronics have sufficient storage to retain the information until communication is reestablished. Also, the data collection does not begin until the ball is struck and the data is only collected and stored while the ball is in motion. Of course, there is nothing to be gained by collection of data while the ball is stationary except for its position upon landing so that the user can more easily find the ball when it is hit off the course.

Figure 4:
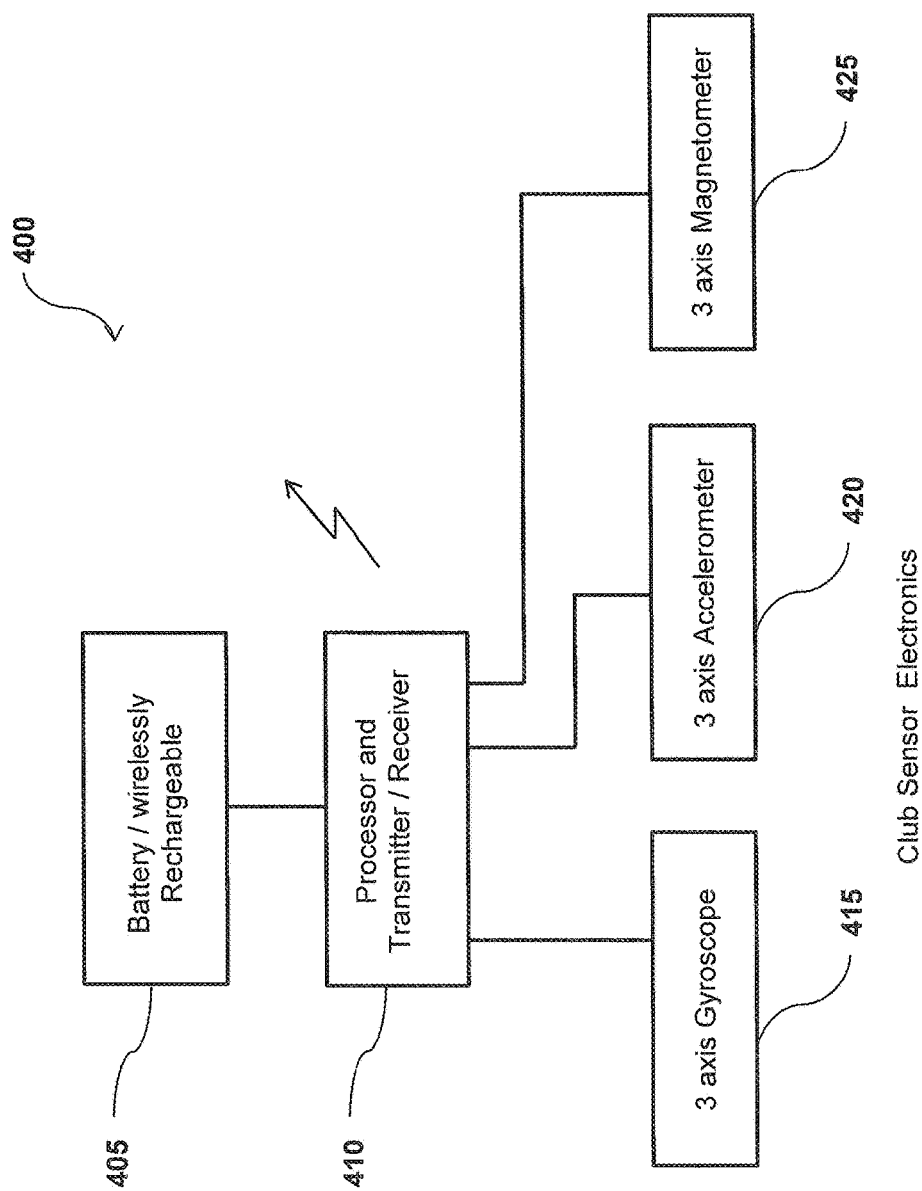
FIG. 4 depicts illustrative golf club electronics in accordance with some embodiments of the present invention.

Referring to FIG. 4, one embodiment of the golf club electronics 400 is illustrated. The golf club electronics 400 may also include a power source 405, a processor and transceiver 410, a 3-axis gyroscope 415, a 3-axis accelerometer 420, and a 3-axis magnetometer 425. Preferably, the golf club electronics 400 are located in the golf club head. The power source 405 and the processor and transceiver 410 are identical to those described in the golf ball electronics and their details will not be repeated here for the sake of brevity. Discussion of the connections between the power source 405, the processor and transceiver 410, and each of the gyroscope 415, accelerometer 420, and magnetometer 425 are similarly omitted for the same reason.

The 3-axis gyroscope 415 measures golf club rotation and produces golf club rotation data in three axes $g_{2x}$, $g_{2y}$, and $g_{2z}$. The 3-axis accelerometer 420 measures golf club acceleration and produces golf club acceleration data in three axes $a_{2x}$, $a_{2y}$, and $a_{2z}$. The 3-axis magnetometer 425 measures golf club magnetism and produces golf club magnetism data in three axes $m_{1x}$, $m_{1y}$, and $m_{1z}$. These sensors may be activated upon detection of the motion of the golf club or prior to a golf game. All of the above data may be stored in a transient or non-transient memory located in the golf club. Transient memory may be RAM or other types of memory used for temporarily storing data. Non-transient memory may be ROM, EPROM, EEPROM, and flash memory the like. In a preferred embodiment, the non-transient memory is a flash memory. All the data may be stored in the same or different memory. The term "golf club" mentioned in this paragraph and paragraphs related to FIG. 4 may refer to the head of the golf club, the handle of the golf club (where a golfer holds the golf club), the shaft of the golf club (the interconnection between the head and handle of the golf club), or any combination thereof.

Using one or more of the above data, additional data such as swing velocity, swing height, angle of impact, and slicing angle may be obtained. Moreover, additional data like effective acceleration of the golf club, angle of golf ball flight, and impact force on the golf club (or the head of the golf club) may also be obtained with the following equations:

Effective Acceleration of the Golf Club $a_{2e} = \sqrt{a_{2x}^2 + a_{2y}^2 + a_{2z}^2}$ Angle of Golf Ball Flight=$\tanh^{-1}$ of $a_{2x}, a_{2y},$ and $a_{2z}$ Impact Force on Golf Club (F2)=Mass of Golf Club×$a_{2e}$ The mass or weight of the golf club is pre-measured prior to being utilized in the system. The mass is saved as a constant in the algorithms (see below), which could be stored in the processor 410 or the memory of the processor 410, or in the smart device. The mass may also refer to the mass or weight of the head of the gold club. The ratio of F1 (discussed on page 6 of the application) and F2 indicates the strike area of interface between the golf club head and the golf ball.

In a preferred embodiment, the algorithms for calculating swing velocity, swing height, angle of impact, slicing angle, effective acceleration of the golf club, angle of ball flight, impact force on the golf club, and the ratio of F1 and F2 are stored in the processor 410 or the memory of the processor 410 and these parameters are calculated by the processor 410. After calculating one, some, or all of these parameters, the calculated parameters are transmitted to the smart device via a communication protocol discussed above. As such, the smart device does not perform any calculations using the data obtained from the golf club or any parameter calculations for the golf club. In another preferred embodiment, the algorithms are stored in the smart device and the calculations of those parameters are performed by the smart device after the sensors measure and transmit the data to the smart device. As such, no calculations are performed in the processor 410.

Figure 5:
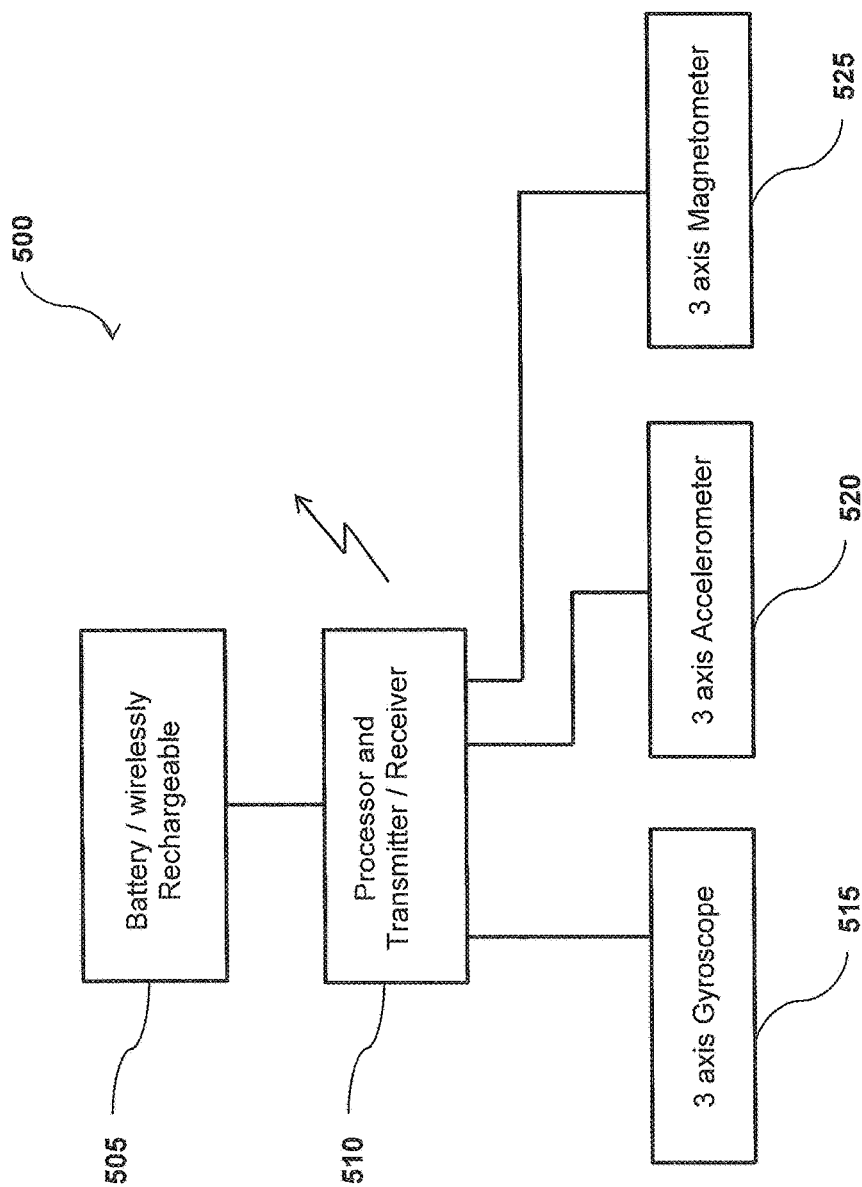
FIG. 5 depicts illustrative wearable device electronics in accordance with some embodiments of the present invention.

Referring to FIG. 5, one embodiment of the wearable device electronics 500 is illustrated. The wearable device electronics 500 may similarly include a power source 505, a processor and transceiver 510, a 3-axis gyroscope 515, a 3-axis accelerometer 520, and a 3-axis magnetometer 525. The power source 505 and the processor and transceiver 510 are identical to those described in the golf ball electronics and their details will not be repeated here for the sake of brevity. Discussion of the connections between the power source 505, the processor and transceiver 510, and each of the gyroscope 515, accelerometer 520, and magnetometer 525 are similarly omitted for the same reason. The wearable device may be a watch, a band, or any device worn by the golfer on his or her wrist, arm, or hand. A skilled artisan would understand that the wearable device would be used in addition to the smart device. Furthermore, some smart devices that can be worn or applied to the person in a carrying case, sling, holder or other means of attachment could be considered as a wearable device. In that situation, the smart device would be a different device from the wearable device in order to properly conduct the preferred embodiments of the invention.

The 3-axis gyroscope 515 measures hand rotation and produces hand rotation data in three axes $g_{3x}, g_{3y},$ and $g_{3z}$.

The 3-axis accelerometer 520 measures hand acceleration and produces hand acceleration data in three axes $a_{3x}, a_{3y},$ and $a_{3z}$. The 3-axis magnetometer 525 measures magnetism change resulted from swinging the wearable device on the hand and produces magnetism change data in three axes $m_{3x}, m_{3y},$ and $m_{3z}$. These sensors may be activated upon detection of the motion of the hand or prior to a golf game. Each of the gyroscope 515, accelerometer 520, and magnetometer 525 may also obtain data related the golfer's wrist or arm as opposed to his or her hand (such as wrist acceleration, wrist rotation, magnetism change resulted from swinging the wearable device on the wrist, arm acceleration, arm rotation, magnetism change resulted from swinging the wearable device on the arm). All of the above data may be stored in a transient or non-transient memory located in the wearable device. Transient memory may be RAM or other types of memory used for temporarily storing data. Non-transient memory may be ROM, EPROM, EEPROM, and flash memory the like. In a preferred embodiment, the non-transient memory is a flash memory. All the data may be stored in the same or different memory.

Using one or more of the above data, additional data such as swing angle of golfer's hand, wrist, or arm, swing angle of the golf club, both of the swing angles, a ratio of the swings, or an index representative of the two swing angles may be obtained. Moreover, additional data like effective acceleration of the wearable device and angle of golf ball flight may also be obtained with the following equations:

Effective Acceleration of the Wearable Device $a_{3e} = \sqrt{a_{3x}^2 + a_{3y}^2 + a_{3z}^2}$ Angle of Golf Ball Flight=$\tanh^{-1}$ of $a_{3x}, a_{3y},$ and $a_{3z}$ In a preferred embodiment, the algorithms for calculating swing angle of golfer's hand, wrist, or arm, swing angle of the golf club, both of the swing angles, a ratio of the swings, an index representative of the two swing angles, effective acceleration of the ball, and angle of ball flight are stored in the processor 510 or the memory of the processor 510 and these parameters are calculated by the processor 510. After calculating one, some, or all of these parameters, the calculated parameters are transmitted to the smart device via a communication protocol discussed above. As such, the smart device does not perform any calculations using the data obtained from the wearable device or any parameter calculations for the wearable device. In another preferred embodiment, the algorithms are stored in the smart device and the calculations of parameters are performed by the smart device after the sensors measure and transmit the data to the smart device. As such, no calculations are performed in the processor 510.

With a system comprising the above golf ball, golf club, wearable device, and their associated electronics, the system in one embodiment can obtain golf-related data in the following manner:

|  | Golf Ball | Golf Club | Wearable Device |
| --- | --- | --- | --- |
| Before the strike | No data collection or parameter calculation. | Calculates impact force on golf ball, swing velocity of golf club, swing height, angle of impact, slicing angle, etc. | Calculates swing angle of golfer's hand, wrist, or arm, swing angle of the golf club, both of the swing angles, a ratio of the swings, an index representative |

|  | Golf Ball | Golf Club | Wearable Device |
|---|---|---|---|
| After the strike | Collects data continuously at 30 Hz. Stores collected data in golf ball to prevent loss of data due to loss of communication with smart device. Sends a copy of stored data to smart device via a communication protocol. | No data collection or parameter calculation. | of the two swing angles, etc. No data collection or parameter calculation. |

In this embodiment, some or all of the golf ball electronics are configured to perform data measurement only after the golf ball is struck and calculations of parameters related to the golf ball are performed by the smart device, some or all the golf club electronics are configured to perform data measurement and calculate parameters related to the golf club only before the golf ball is struck, and some or all of the wearable device electronics are configured to perform data measurement and calculate parameters related to the wearable device only before the golf ball is struck. In this instance, data fusion of all data and parameters at the smart device occurs after the golf ball electronics transmit data measurement to the smart device (no calculation on the golf ball), after the golf club electronics calculate the golf club's parameters at the golf club and transmit those parameters to the smart device, and after the wearable device electronics calculate the wearable device's parameters at the wearable device and transmit those parameters to the smart device.

In another embodiment, the golf club electronics and the wearable device may be configured to merely perform data measurement and calculation of parameters related to the golf club and the wearable device are performed by the smart device. In this instance, data fusion of all data and parameters at the smart device can occur after the golf club electronics and the wearable device electronics perform data measurement (without calculating any parameters) and transmit those data measurement to the smart device. In a further embodiment, data fusion at the smart device may occur before calculating any parameters using those data measurement at the smart device or after calculating one or more parameters using those data measurement at the smart device. Data fusion, in this embodiment or in any of the embodiments disclosed in this application, may refer to compilation of all the data measurement without any calculated parameters, combination of certain or all data measurement in order to calculate certain or all parameters, combination of both data measurement and calculated parameters, compilation of only calculated parameters, or any combination thereof.

Once data measurement is initiated, either before or after the golf ball is struck, data measurement may be performed by one, some, or all of the sensors. Once parameter calculation is initiated, either before or after the golf ball is struck, parameter calculation may be performed by only the processor, by the combination of the processor and one, some, or all of the sensors, or by only the smart device after data measurement has been transmitted to the smart device.

In another embodiment, the system can obtain golf-related data in the following manner:

|  | Golf Ball | Golf Club | Wearable Device |
|---|---|---|---|
| Before the strike | No data collection or parameter calculation. | No data collection or parameter calculation. | No data collection or parameter calculation. |
| After the strike | Collects data continuously at 30 Hz. Stores collected data in golf ball to prevent loss of data due to loss of communication with smart device. Sends a copy of stored data to smart device via a communication protocol. | No data collection or parameter calculation. | No data collection or parameter calculation. |

In this embodiment, the system may be configured such that only the golf ball electronics are collecting data after the golf ball is struck. The golf ball electronics perform no data collection or parameter calculation before the golf ball is struck. The golf club electronics and the wearable device electronics are configured to perform no data collection or parameter calculation before and after the golf ball is struck. After collecting the data, the transceiver of the golf ball may transmit the collected data to the smart device for parameter calculation. In another embodiment, the processor of the golf ball may perform parameter calculations after data collection and transmit the calculated parameters to the smart device for display. In this situation, the smart device performs no calculations.

In yet another embodiment, the system can obtain golf-related data in the following manner:

|  | Golf Ball | Golf Club | Wearable Device |
|---|---|---|---|
| Before the strike | No data collection or parameter calculation. | Performs only data collection. | No data collection or parameter calculation. |
| After the strike | No data collection or parameter calculation. | Performs only data collection. | No data collection or parameter calculation. |

In this embodiment, the system may be configured such that only the golf club electronics perform only data collection either or both before and after the golf ball is struck. After data collection in either instance or both instances, the data is transmitted to the smart device for parameter calculation. The golf ball electronics and the wearable device electronics are configured to perform no data collection or parameter calculation before and after the golf ball is struck.

Figure 6:
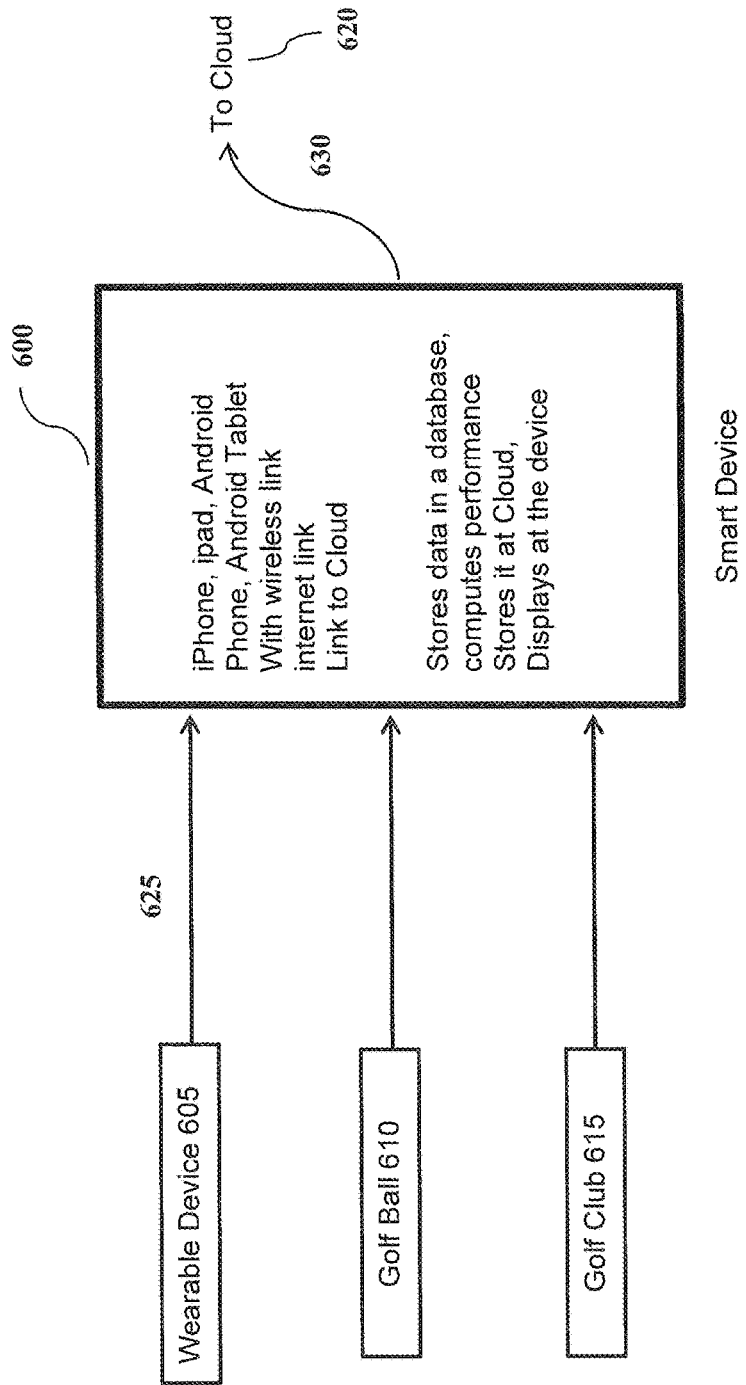
FIG. 6 depicts an illustrative smart device in accordance with some embodiments of the present invention.
Figure 7:
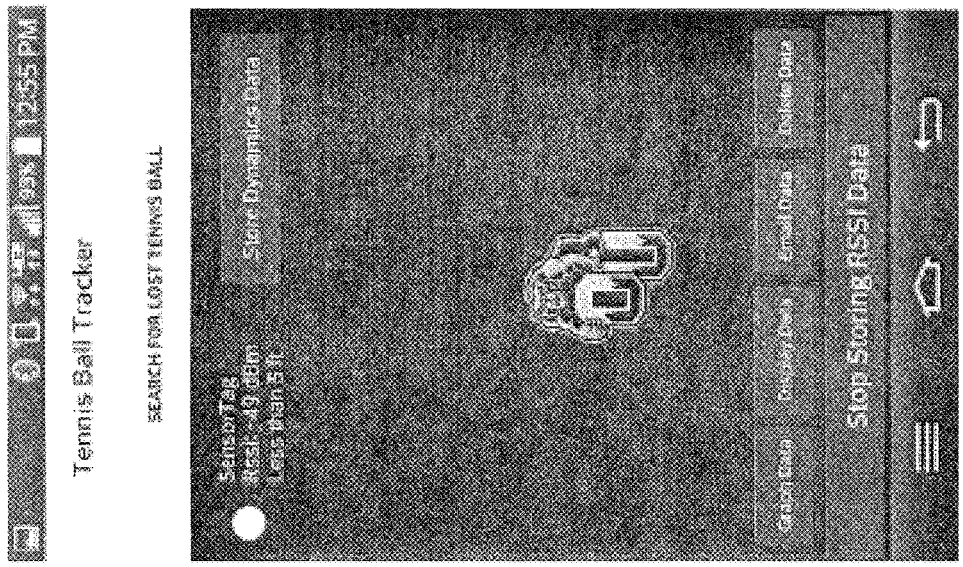
FIG. 7 depicts a sample display on a smart device in accordance with some embodiments of the present invention.

Referring to FIG. 6, one embodiment of the smart device 600 is illustrated. The smart device 600 may be a mobile device, such as Android-based smartphone, iPhone, iPad, tablet, PDA, a computer, or a server. Data from the wearable device 605, the golf ball 610, and the golf club 615 are transmitted to the smart device 600 via a communication protocol 625 described above. The smart device 600 may compute and calculate additional data or parameters based on the received data. Data from the wearable device 605, the golf ball 610, and the golf club 615 and the obtained additional data or parameters may be saved in a database created by the smart device and/or be uploaded to the Cloud via another communication protocol 630 described above for later retrieval and viewing at any location. The communication protocol 625 and the another communication protocol 630 may be the same or different. Some or all of these data may be displayed on the screen of the smart device 600. FIG. 7 depicts a sample display on a smart phone.

Figure 8:
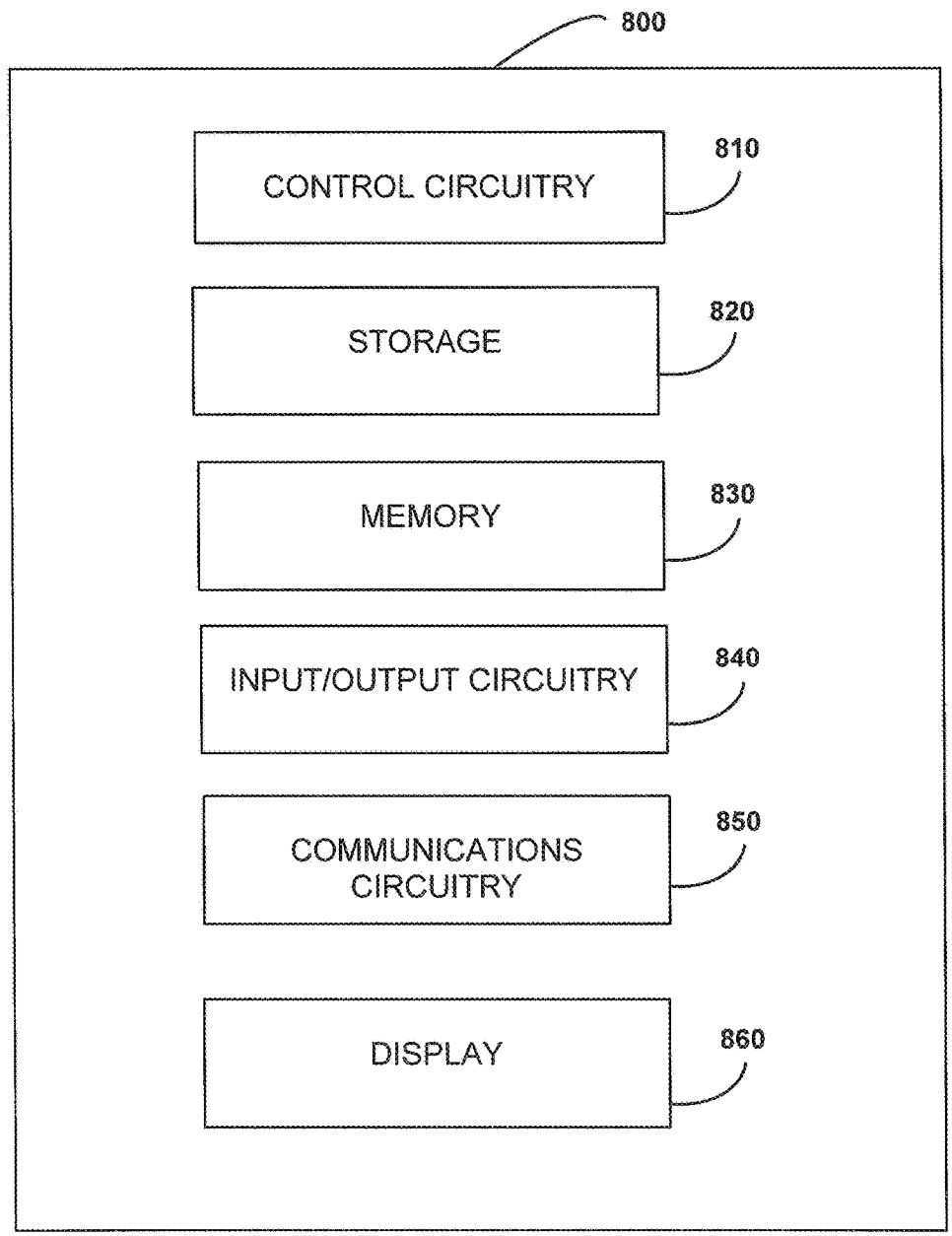
FIG. 8 depicts illustrative smart device electronics in accordance with some embodiments of the present invention.

The smart device, like the golf ball, the golf club, and the wearable device, may also include a plurality of electronics. FIG. 8 illustrates one embodiment of the smart device electronics 800. The smart device electronics 800 may comprise a processor 810, storage 820, memory 830, input/output ("I/O") circuitry 840, communications circuitry 850, and a display 860. As appreciated by those skilled in the art, the smart device electronics can include other components not combined or included in those shown in this Figure, e.g., a power supply, an input mechanism, etc.

The processor 810 may be similar or identical to the processor described above. The processor 810 or processing circuitry is operative to control the operations and performance of the smart device or the electronics in the smart device. For example, the processor 810 can be used to run operating system applications and firmware applications of the smart device or the electronics in the smart device, or other applications used by the processor 810 to communicate with each electronic in the smart device, golf ball, golf club, and wearable device. In addition, the processor 810 can drive the display 860 and process inputs received from a user interface, e.g., the display 860 if it is a touch screen.

The storage 820 may include, for example, one or more tangible computer storage devices including a hard-drive, solid state drive, flash memory, permanent memory such as ROM, magnetic, optical, semiconductor, or any other suitable type of storage component, or any combination thereof. The storage 800 can store, for example, application data for implementing functions on the smart device (such as operating system applications and firmware applications for communicating with the gyroscope, accelerometer, and magnetometer), authentication information such as libraries of data associated with authorized users, data from the gyroscope, accelerometer, and magnetometer, and wireless connection data that can enable the smart device to establish a wireless connection, and any other suitable data or any combination thereof. The instructions for implementing the functions of the present invention may, as non-limiting examples, comprise non transient software and/or scripts stored in the computer-readable media 820.

The memory 830 may include cache memory, semi-permanent memory such as RAM, and/or one or more types of memory used for temporarily storing data. In some embodiments, the memory 830 can also be used for storing data to operate smart device applications, or any other data from the storage 820. In some embodiments, the memory 830 and the storage 820 can be combined as a single storage medium.

The I/O circuitry 840 can be operative to convert and encode/decode, analog signals and other signals into digital data. In some embodiments, I/O circuitry 840 can also convert digital data into another type of signal, and vice-versa. For example, I/O circuitry 840 can receive and convert physical contact inputs from a multi-touch screen such as the display 860, physical movements from a mouse or sensor, analog audio signals from a microphone, or other input. The digital data can be provided to and received from the processor 810, the storage 820, and the memory 830, or any other electronic of the smart device 800. Although the I/O circuitry 840 is illustrated in this Figure as a single component of the smart device 800, several instances of I/O circuitry 840 can be included in the smart device 800.

The smart device 800 can include any suitable interface or component for allowing a user to provide inputs to the I/O circuitry 840. For example, the smart device can include a button, keypad, dial, a click wheel, or a touch screen, e.g., display 860.

The display 860 includes a display circuitry for providing a display visible to the user. For example, the display circuitry can include a screen, e.g., an LCD screen, that is incorporated in the smart device. In some embodiments, the display circuitry can include a coder/decoder (Codec) to convert digital data into analog signals and vice versa. For example, the display circuitry or other appropriate circuitry within the smart device can include Codecs necessary to process data from the gyroscope, accelerometer, and magnetometer, or any other suitable type of Codec.

The display circuitry also can include display driver circuitry, circuitry for driving display drivers, or both. The display circuitry can be operative to display content, e.g., application screens for applications implemented on the smart device 800, information regarding ongoing communications operations, information regarding incoming communications requests, or device operation screens, under the direction of the processor 810. Alternatively, the display circuitry can be operative to provide instructions to a remote display.

The communications circuitry 850 may be similar or identical to the transceiver described above. In addition, the smart device 800 can include one or more instances of the communications circuitry 850 for simultaneously performing several communications operations using different communications networks, although only one instance of the communications circuitry 850 is shown in FIG. 8 to avoid overcomplicating the drawing. For example, the smart device 800 can include a first instance of communications circuitry 850 for communicating over a cellular network to one or more of the gyroscopes, a second instance of communications circuitry 850 for communicating over Wi-Fi to one or more of the accelerometers, and a third instance of communications circuitry 850 for communicating over Bluetooth to one or more of the magnetometers. In some embodiments, the same instance of communications circuitry 850 can be operative to provide for communications over several communications networks.

The chips and circuits in all the electronics and sensors may be graphene-based. In particular, the graphene in the chips and circuits is preferable produced via chemical vapor deposition (CVD). Graphene-based chips and circuits manufactured via CVD of graphene are strengthened and more flexible compared to chips and circuits without graphene and chips and circuits manufactured via non-CVD methods. Graphene-based chips and circuits manufactured via CVD of graphene also allow faster signal or data transmission within the chips and circuits themselves and to other electronic devices.

The present invention provides more accurate ways to measure golf ball flight, golf ball location and golfer performance with reduced power consumption. This improvement is achieved through data collection from the gyroscope, accelerometer, and magnetometer in each of the golf ball, golf club, and wearable device. The data is sampled and collected in real time in a three dimension space while the golfer and/or golf ball is in motion, before the golfer and/or golf ball's motion, and after the golfer and/or golf ball's motion. The system recognizes those motion as a predetermined game type as functions of one another through the pulling of data from the golf ball, golf club, wearable device, golf club, and/or the smart device. The data may also contain feature points such as power-assisting path early stage corresponding feature point, motion top point corresponding feature point, and ball hitting time corresponding feature point, etc. The system includes a golf ball, a golf club, and a wearable device. Each apparatus has similar sensors to collect data at different times and each data can be recorded or analyzed individually. For example, the golf club electronics collect data right before and/or right after the golf club strikes the golf ball and after that no more data is collected from the golf club electronics. The golf ball upon strike starts collecting the data from the moment it is struck until it lands on the ground and stops rolling. The golf ball data will include information during the flight of the golf ball until landing and can be analyzed to compute flight data such as speed, acceleration, rotation, force, height and range.

The wearable device, like the golf club, also collects data right before and/or right after the golf ball is struck and stops collecting data afterwards. The feature points refer to data or data points collected at specific times starting from the moment the golfer swings his or her golf club until the golf ball lands and stops rolling. The data from the golf ball, golf club, and wearable device are fused, which may mean that all those data are synthesized to calculate more accurate data. More accurate data may refer to supplementing or modifying the data collected by one apparatus by using the data collected from the other apparatuses so that the data collected by the one apparatus becomes more accurate. More accurate data may also refer to calculating additional data that are different from the collected data by using the combination of data from some or all of the apparatus, which are more accurate if that additional data is calculated based on data from only one apparatus. These are some benefits that are not found in the prior art.

Velocity is a second dimension function (i.e., the integration of acceleration) and smaller than the top point feature of velocity threshold. Ball hitting is a feature point and set at an acceleration rate larger than a predetermined hitting acceleration rate. One or more of the data obtained by the gyroscope, accelerometer, and magnetometer of the golf ball are transmitted to the smart device through their corresponding transceiver and a first database storing that data is created with time stamp in the storage or memory of the smart device. One or more of the data obtained by the gyroscope, accelerometer, and magnetometer of the golf club are transmitted to the smart device through the golf ball's transceiver and a second database storing that data is created with time stamp in the storage or memory of the smart device. One or more of the data obtained by the gyroscope, accelerometer, and magnetometer of the wearable device are transmitted to the smart device through the wearable device's transceiver and a third database storing that data is created with time stamp in the storage or memory of the smart device. Some or all of the above data are fused at the smart device in real time to calculate golf ball flight, golf ball location and golfer performance.

In some embodiments, the gyroscope on the wearable device may be configured to sample angular velocity data. The sample angular velocity data may be subsequently transmitted to the smart device for calculating other parameters or to the golf ball and be fused with the data gathered from the golf ball prior to transmitting to the smart device for calculating other parameters.

The processor of the golf ball, the golf club, and the wearable device and the processor of the smart device may have specialized algorithms or execute specialized instructions to calculate golf ball trajectory, golf ball speed, golf ball height, golf ball rotation, golf ball location, impact force on golf ball, swing velocity of golf club, swing height, angle of impact, slicing angle, swing angle, rotation of hand, effective acceleration, angular velocity, angle of flight, acceleration of gravity, distance to the pin, drive distance, training information, and any other parameters discussed above. In some embodiments, parameters related to the golf ball may be determined based on solely the data gathered by the golf ball or the combination of data from the golf ball, golf club, and the wearable device (or from any two of the golf ball, golf club, and the wearable device). The same applies to the parameters related to the golf club and the parameters related to the wearable device.

In some embodiments, the specialized algorithms may be based on Fibonacci sequence. In some embodiments, the specialized algorithms can determine the amount of time the ball is on the ground, in the air, and if it is in the hole and scores. The specialized algorithms or instructions may also determine the frequency at which the data is collected, such as 30 Hz. The calculated values are may be displayed as a plot or graph on the display of the smart device, and all the data, databases, and calculated values may be sent to the Cloud for permanent storage and viewing at any location at any time.

The processor is preferably a low power processor such as a Bluetooth low energy (BLE) processor or other processor that consumes considerably less power while maintaining its normal processing power and communication range. The processor is also preferably configured to initiate data collection on the gyroscope, accelerometer, and magnetometer, and communicates the collected data every microsecond to the smart device through a communication protocol described above. When the processor is configured to communicate the collected to the smart device, the transceiver may be configured to be off. When the processor is configured to communicate some or all of the collected to the smart device, the transceiver or communications circuitry may be configured to transmit the remaining data to the smart device. When both the processor and the transceiver are employed to communicate the collected to the smart device, the communication protocol adopted by the processor may be the same as or different from the communication protocol adopted by the transceiver. The sensors are also preferably low power sensors such as Bluetooth low energy (BLE) sensors or other sensors that consume considerably less power while maintaining their normal sensing capabilities and communication range.

The present invention is also applicable to other sports such as tennis (with the corresponding electronics in the tennis racket, tennis ball, and wearable device), baseball (with the corresponding electronics in the baseball bat, baseball, and wearable device), hockey (with the corresponding electronics in the hockey stick, hockey puck, and wearable device), basketball, football, bowling, soccer, javelin, shot-put, etc. As such, the present invention generally may be a system for obtaining sport-related data comprising an object having associated electronics to measure data related to the object; a hitting device having associated electronics to measure data related to the hitting apparatus, wherein the play of a sports game follows the state of the object as it is hit by the hitting apparatus; a wearable device having associated electronics to measure data related to the wearable device; and a smart device having associated electronics to communicate with the object, the hitting apparatus, and the wearable device. The system, each device in the system, and the associated electronics in each device may adopt any of the embodiments and configurations described in this application. The object may be a ball or other similar objects that serve similar purpose as the ball. The object or the ball needs not refer to a spherical object and can take on any other forms or shapes. This system may be applicable to golf, tennis, hockey, or other similar sports. The object may be a golf ball, a tennis ball, a puck, or the like. The hitting apparatus may be a golf club, a tennis racket, a hockey stick, or the like. The specialized algorithms and/or the electronics may be modified to fit the particulate sports game in order to obtain and calculate the corresponding data and parameters. The specialized algorithms and/or the electronics may also determine if the object goes through or into a net or goal and whether it scores or misses the net or goal. The specialized algorithms may further measure, if the sports game is basketball, the amount time of the ball touches the ground, the amount of time the ball is carried in hand, and the time interval between each dribble or ball bounce. In addition to assisting the user in evaluating and improving performance, such data can be collected to assist referees in determining whether such actions and motions are within the legal requirements for acceptable rather than objectionable performance (e.g., a turnover due to carrying rather than dribbling the ball).

In another variation, the present invention generally may be a system for obtaining sport-related data comprising an object having associated electronics to measure data related to the object, wherein the play of a sports game follows the state of the object as it is hit, kicked, or thrown by players; a plurality of electronics installed in a goal structure; a wearable device having associated electronics to measure data related to the wearable device; and a smart device having associated electronics to communicate with the object, the wearable device, and the plurality of electronics installed in a goal structure. The system, each device in the system, the associated electronics in each device, and the plurality of electronics installed in goal structure may adopt any of the embodiments and configurations described in this application.

In these variations, the object may be a ball or other similar objects that serve similar purpose as the ball. The object or the ball needs not refer to a spherical object and can take on any other forms or shapes. The sensors in the ball or object can be used to determine trajectory and accuracy of flight motion. The plurality of electronics installed in a goal structure may further comprise a near field frequency sensor in addition to the gyroscope, accelerometer, and magnetometer. This system may be applicable to basketball, soccer, or other similar sports. The object may be a basketball, a soccer ball, or other similar objects. The goal structure may be a hoop, a backboard of the hoop, the net, or any combination of the hoop, new and backboard, a soccer goal, net of the soccer goal, posts of the soccer goal, or other similar goal structures.

Other similar sports include but not limited to bowling, football, javelin, and shot-put. Other similar objects include but not limited to the corresponding objects in bowling, football, javelin, and shot-put. Other similar goal structures include but not limited to the corresponding goal structures in bowling, football, javelin, and shot-put. The specialized algorithms may be modified to fit the particulate sports game in order to obtain and calculate the corresponding data and parameters. Also, the sensors that are applied to the structures can determine forces thereon. For example, the forces on a hoop or backboard caused by the movement and rotation of the ball can be measured as it strikes the hoop or backboard. The same type of information can be obtained for an object such as an arrow hitting a target or a discus hitting a field marker.

While all the systems and their embodiments described in this application involve a combination of the golf ball and its associated electronics (or the object and its associated electronics), the golf club and its associated electronics (or the hitting apparatus and its associated electronics), the wearable device and its associated electronics, the smart device and its associated electronics, and the plurality of electronics installed in a goal structure, in some embodiments, the system may involve or include only one of the sensors or devices and its associated electronics or any combination of the sensors and their associated electronics, the devices and their associated electronics, and/or the plurality of electronics installed in a goal structure. In some embodiments, "involve" may mean that the system comprises all the above sensors, devices, and electronics but only a certain sensors, devices, and/or electronics are configured to perform required functions. Additionally, other sensors and electronics such as radio-frequency identification (RFID) tags or other sensor tags, GPS, and antennas may also be included in or on the golf ball (or the object), golf club (or the hitting apparatus), wearable device, smart device, and plurality of electronics installed in a goal structure.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

What is claimed is:

1. A system for obtaining golf-related data comprising:
a golf ball having associated electronics to measure data related to the golf ball;
a golf club having associated electronics to measure data related to the golf club;
a wearable device having associated electronics to measure data related to the wearable device;
a smart device having associated electronics to communicate with the golf club, the golf club, and the wearable device, the associated electronics of the smart device comprising a processor configured to calculate additional data using at least one of the data related to the golf ball, the data related to the golf club, and the data related to the wearable device, with the additional data being different from the data related to the golf ball, the data related to the golf club, and the data related to the wearable device; and
wherein the associated electronics of the golf ball comprise a processor and transceiver each including chemical vapor deposited graphene, with the processor of the golf ball programmed with algorithms based on a Fibonacci sequence, wherein the processor and transceiver of the golf ball are configured to measure acceleration of the golf ball by using the algorithms based on the Fibonacci sequence while also being configured to transmit the measured acceleration of the golf ball to the smart device via a communications protocol, and with the transmission of the measured acceleration from the golf ball to the smart device facilitated by the graphene in the processor and transceiver;
wherein the associated electronics of the golf club comprise a processor and transceiver configured to calculate additional data for the golf club using the data related to the golf club while also being configured to transmit the additional data of the golf club to the smart device via a communications protocol; and
wherein the associated electronics of the wearable device comprise a processor and transceiver configured to calculate additional data for the wearable device using the data related to the wearable device while also being configured to transmit the additional data of the wearable device to the smart device via a communications protocol.

2. The system according to claim 1, wherein the smart device is configured to calculate additional data using only the data related to the golf ball and to fuse the calculated additional data with the additional data for the golf club and the additional data for the wearable device.

3. The system according to claim 2, wherein the data related to the golf ball includes one or all of golf ball rotation data, golf ball acceleration data, and golf ball magnetism data.

4. The system according to claim 3, wherein the calculated additional data includes one or all of effective acceleration of golf ball, angle of golf ball flight, and impact force on golf ball.

5. The system according to claim 2, wherein the data related to the golf club includes one or all of golf club rotation, golf club acceleration, and golf club magnetism.

6. The system according to claim 5, wherein the additional data for the golf club includes one or all of effective acceleration of golf club, angle of ball flight, and impact force on golf club.

7. The system according to claim 2, wherein the data related to the wearable device includes one or all of hand rotation data, hand acceleration data, and magnetism change data resulted from swinging the wearable device.

8. The system according to claim 7, wherein the additional data for the wearable device includes one or all of effective acceleration of wearable device, angle of golf ball flight, swing angle of golfer's hand, and swing angle of golf club.

9. The system according to claim 1, wherein the communications protocol is WiFi, Bluetooth, 802.11, Bluetooth, a radio frequency system, infrared, GSM, GSM plus EDGE, CDMA, quadband, or any other suitable protocol.

10. The system according to claim 1, wherein the associated electronics of the golf ball are configured to measure data related to the golf ball on 30 Hz basis.

11. A system for obtaining golf-related data comprising:
a golf ball including at least one, two or each of a gyroscope, an accelerometer, and a magnetometer to measure data related to the golf ball, wherein each of the gyroscope, the accelerometer, and the magnetometer of the golf ball is configured to measure data related to the golf ball after the golf ball is struck, and a processor and transceiver each including chemical vapor deposited graphene, wherein the processor of the golf ball is programmed with algorithms based on a Fibonacci sequence, wherein the processor, transceiver, and the accelerometer of the golf ball are configured to measure acceleration of the golf ball by using the algorithms based on the Fibonacci sequence while also being configured to transmit the measured acceleration of the golf ball to another device via a communications protocol, and with the transmission of the measured acceleration from the golf ball to the other device facilitated by the graphene in the processor and transceiver;
a golf club including at least one, two or each of a gyroscope, an accelerometer, and a magnetometer to measure data related to the golf club, wherein each of the gyroscope, the accelerometer, and the magnetometer of the golf club is configured to measure data related to the golf club only before the golf ball is struck;
a wearable device including at least one, two or each of a gyroscope, an accelerometer, and a magnetometer to measure data related to the wearable device, wherein each of the gyroscope, the accelerometer, and the magnetometer of the wearable device is configured to measure data related to the wearable device only before the golf ball is struck; and
a smart device including a processor and a non-transient memory, the processor is configured to calculate additional data using at least one of the data related to the golf ball, the data related to the golf club, and the data related to the wearable device, the additional data is different from the data related to the golf ball, the data related to the golf club, and the data related to the wearable device.

12. The system according to claim 11, wherein the processor is configured to calculate additional data using only the data related to the golf ball.

13. The system according to claim 11, wherein the data related to the golf ball, the data related to the golf club, and the data related to the wearable device are measured in real time.

14. The system according to claim 13, wherein each of the measured data related to the golf ball, the measured data related to the golf club, and the measured data related to the wearable device is stored in the non-transient memory with a time stamp.

15. The system according to claim 11, wherein each of the golf ball, golf club, and wearable device further comprises a wirelessly chargeable power source.

16. The system according to claim 11, wherein the processor is a Bluetooth low energy processor.

17. The system according to claim 11, wherein each of the golf ball, golf club, and wearable device further comprises a processor.

18. The system according to claim 17, wherein the processor of the golf ball, golf club, wearable device, and smart device is a Bluetooth low energy processor.

19. The system according to claim 11, wherein the gyroscope, accelerometer, and magnetometer in each of the golf ball, golf club, and wearable device is graphene-based.

20. The system according to claim 11, wherein each of the gyroscope, the accelerometer, and the magnetometer of the golf club is configured to measure data related to the golf club before each of the gyroscope, the accelerometer, and the magnetometer of the wearable device measures data related to the wearable device.

21. A system for obtaining sport-related data comprising:
a ball or game implement having associated electronics to measure data related to the ball or game implement;
a structure separate from the ball or game implement and used in connection therewith also having associated electronics to measure data related to the structure;
a wearable device having associated electronics to measure data related to the wearable device;
a smart device having associated electronics to communicate with the ball or game implement, the structure, and the wearable device, the associated electronics of the smart device comprising a processor configured to calculate additional data using at least one of the data related to the ball or game implement, the data related to the structure club, and the data related to the wearable device, with the additional data being different from the data related to the ball or implement, the data related to the structure, and the data related to the wearable device; and wherein the associated electronics of the ball or game implement comprise a processor and transceiver each including chemical vapor deposited graphene, with the processor programmed with algorithms based on a Fibonacci sequence, wherein the processor and transceiver are configured to measure acceleration of the ball or game implement by using the algorithms based on the Fibonacci sequence while also being configured to transmit the measured acceleration of the ball or game implement to the smart device via a communications protocol, and with the transmission of the measured acceleration from the ball or game implement to the smart device facilitated by the graphene in the processor and transceiver;

wherein the associated electronics of the structure comprise a processor and transceiver configured to calculate additional data for the structure using the data related to the structure while also being configured to transmit the additional data of the structure to the smart device via a communications protocol; and wherein the associated electronics of the wearable device comprise a processor and transceiver configured to calculate additional data for the wearable device using the data related to the wearable device while also being configured to transmit the additional data of the wearable device to the smart device via a communications protocol.

22. The system of claim 21 wherein the ball or game implement is a golf ball, baseball, football, basketball, hockey puck, soccer ball, tennis ball, bowling ball, javelin, discuss, shot-put, badminton birdie or arrow, and the structure is hitting device, such as a golf club, baseball bat, tennis racket, hockey stick, lacrosse stick, badminton racket, ping pong paddle, or a structure to be hit or contacted, such as a bowling pin, goal, goal post, hoop, rim, backboard, net, table, field marker or target.

* * * * *